United States Patent
Mallard et al.

[11] 3,774,031
[45] Nov. 20, 1973

[54] GAMMA CAMERA WITH INCREASED RESOLUTION

[75] Inventors: John Rowland Mallard, Aberdeen, Scotland; Robin John Wilks, Little Chalfont, England

[73] Assignee: National Research Development Corporation, London, England

[22] Filed: Aug. 1, 1969

[21] Appl. No.: 846,701

[30] Foreign Application Priority Data
Aug. 5, 1968  Great Britain .................. 37,346/68

[52] U.S. Cl. .............. 250/503, 250/213 VT, 250/511
[51] Int. Cl. ............................................. G01t 1/20
[58] Field of Search ...................... 250/71.5, 71.5 S, 250/105, 213 VT, 62

[56] References Cited
UNITED STATES PATENTS
3,011,057  11/1961  Anger .................................. 250/71.5
3,489,897  1/1970  Wainer ................................. 250/62
3,491,233  1/1970  Manley ......................... 250/213 VT Primary Examiner—James W. Lawrence
Assistant Examiner—Davis L. Willis
Attorney—Cushman, Darby & Cushman

[57] ABSTRACT

Apparatus for use in investigating the distribution of radiation from an extended source consists of a multi-channel collimator which is so mounted as to be movable in a plane substantially at right angles to the axis of collimation. A gamma camera is described which consists of such a collimator for collimating gamma radiation in association with a scintillation screen, an image intensifier vacuum tube, and means for forming an image of the distribution of light emitted by the scintillation screen upon the photo-cathode of the image intensifier.

9 Claims, 3 Drawing Figures

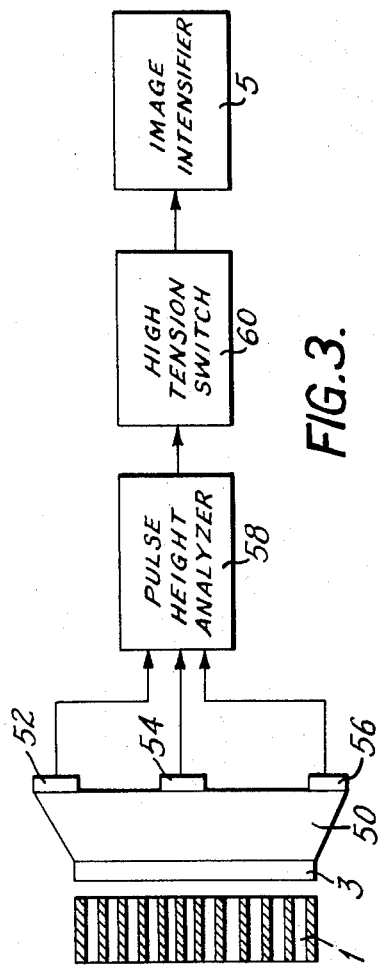
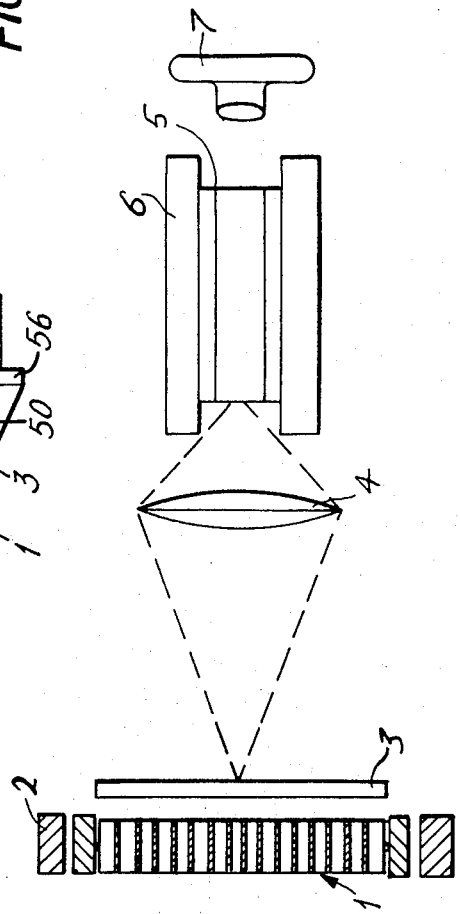
FIG. 3.
FIG. 1.

GAMMA CAMERA WITH INCREASED RESOLUTION

The invention relates to apparatus for use in investigating the distribution of radiation from an extended source of ionizing rays. The invention is concerned particularly, but not exclusively, with gamma cameras, that is devices for sensing γ-radiation emitted by a source and producing an image of the distribution of the radiation emitted by the source.

Conventional gamma cameras comprise a collimating device for the radiation emitted by the source, a scintillation screen of some material such as sodium iodide or caesium iodide which emits visible light when bombarded by the radiation and upon which the collimated radiation is allowed to fall, and means for intensifying the optical image of the radiation distribution produced by the scintillation screen, and transferring it to some form of display.

One form of collimator used in such cameras comprises a honeycomb or grid-like structure made of a heavy absorbing material such as lead, and of some two to ten centimetres in depth, thus providing a large number of narrow channels which provide passages that act to produce a corresponding number of substantially parallel beams of radiation. Effectively, the area of the source of radiation is divided into a mosaic, each constituent area of which corresponds to one of the channels of the collimator. Thus the resolution of which the camera is capable is controlled at least partially by the area of the channels, and by the thickness of the walls, or septa separating them. In practice for conventional collimators, the channels cannot be made less than about 1 mm. square without undue loss in sensitivity, and the thickness of the septa cannot be made less than about 0.1 mm. because of penetration through the septa from one channel to another of non-axial radiation. The result is that with existing collimators an image is produced which consists of a definite array of areas of light separated by dark channels that can mask fine detail and which limits resolution to about 1 cm., which is not entirely satisfactory for many of the diagnostic purposes for which gamma cameras are useful. The resolution is of course also controlled by other factors such as the thickness of the scintillation screen used, due to double Compton scattering and scattering of the light itself in the screen, which affects the signal to noise ratio, and the nature of the image transfer system used. Also, gamma cameras are known in which the image produced upon a scintillation screen is fed by means of a tapered light guide to a mosaic of photomultipliers. In this case, the apertures and separation of the photomultipliers are a factor affecting the overall resolution, as are their sensitivity and signal-to-noise ratio.

It is an object of the invention to provide an improved apparatus for use in investigating the distribution of radiation from an extended source of ionizing rays.

According to the invention there is provided apparatus for use in investigating the distribution of radiation from an extended source of ionizing rays, comprising a multi-channel collimator adapted to collimate such rays parallel to a given axis, and means mounting the collimator for movement relative to the source in a plane substantially at right angles to the said axis.

Preferably the arrangement is such that the movement is continuous and at least approximately random.

According to the invention in another aspect, there is provided a device for investigating the distribution of radiation from an extended source of ionizing rays comprising a multi-channel collimator adapted to collimate such rays parallel to a given axis, and means mounting the collimator for movement relative to the source in a plane substantially at right angles to the said axis.

In a preferred form of the invention, the device is a gamma camera including a multi-channel collimator for gamma radiation, means for moving the collimator in a plane at right angles to the axis of collimation, a scintillation screen so positioned as to receive collimated radiation from the collimator, an image intensifier vacuum tube having a photo-cathode and means for forming an image of the distribution of the scintillation screen upon the photo-cathode of the image intensifier.

The image-forming system may be a lens system which preferably is made out of polymethylmethacrylate which has a greater transmittance for light at the wavelengths characteristically emitted by known scintillation screens than does glass. The scintillation screen may either be in the form of one large crystal or of an active material disposed in a transparent carrier material, or it may be in the form of a mosaic of crystals.

The invention will be further described, with reference to the accompanying drawings in which:

FIG. 1 is a diagrammatic view of a gamma camera embodying the invention: and

Figure 2:
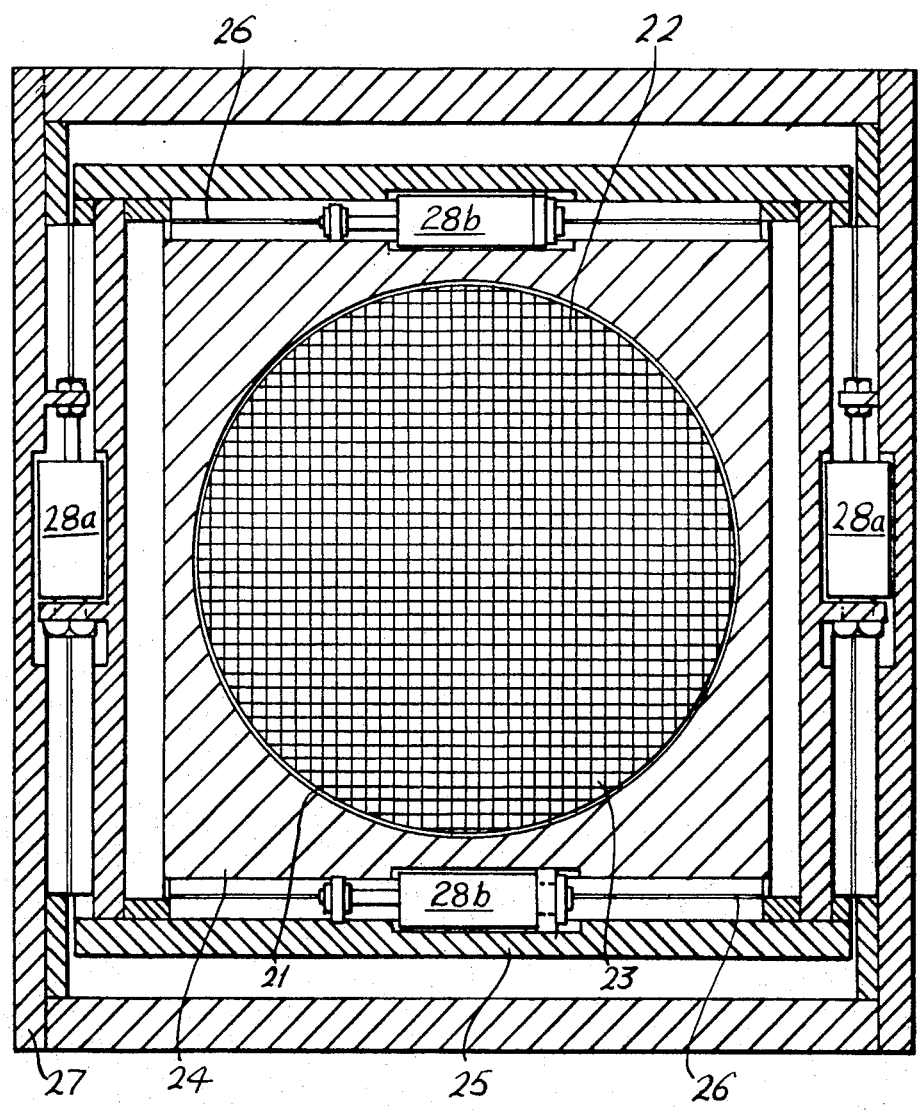
FIG. 2 shows in greater detail a collimator incorporated in the embodiment of FIG. 1.

Referring to the drawings, a gamma camera has a collimator 1, to be described more fully later, that is supported in a frame 2 in such manner that it can be moved in an approximately random fashion in a plane parallel to a caesium iodide crystal scintillation screen 3 some 20 cm. in diameter, or of any convenient diameter such as to give a required field of view, and about ½ cm. in thickness. Photon generating events occurring within the scintillation screen 3 are imaged by a lens system 4, upon the photo-cathode of an image intensifier vacuum tube 5 of a kind supplied by E.M.I. Electronics Ltd. and known by the type number 9694. The components of the lens system 4 are made of polymethylmethacrylate because the transmittance of this material at the wavelength of the light emitted from the scintillation screen 3 is almost an order of magnitude greater than that of conventional optical glasses. Because of the relative areas of the scintillation screen 3 and the photo-cathode of the image intensifier 5, the lens system 4 is arranged to have a magnification of about ⅛ to ¼, depending upon the field size required. The image intensifier 5 is surrounded by a solenoid 6, in conventional fashion, and the final image is recorded either by a camera 7, or by a closed circuit television system, which is not shown in the drawings.

Spurious light emission is caused in the material of the scintillation screen 3 by such things as cosmic rays, double Compton scattering in the material of the scintillation screen 3, and the general activity of the surroundings of the gamma camera. Due to the fact that exposures of some length (5 – 300 secs.) are required, the image intensifier 5 and the camera 7 act as an integrating device, and these stray events reduce the sensitivity of the gamma camera by providing a background illumination of the image intensifier 5, thus reducing the signal-to-noise ratio. A way of improving matters is to operate the image-intensifier 5 in pulses only in response to the occurrence of desired scintillations in the screen 3 as only those events that occur during an operating pulse will be recorded. This will of course mean that the exposure time of the film will have to be increased, but some compensation is achieved because the image-intensifier 5 can be overrun somewhat to produce a brighter image upon its output screen, and the resulting image quality will be substantially improved.

Referring to FIG. 2, the collimator 1 consists of a lead cylinder 21 approximately 25 cm, in diameter and 5 cm. thick that is divided by a grid of lead plates 22, each some 0.75 mm. thick into a large number of cells about 2 mm. square that are aligned with their axes parallel to that of the cylinder 1. In an alternative arrangement, which is not illustrated, the cells are hexagonal in form and are arranged in an hexagonal array. The cells in this form of the collimator are some 6 mm. wide across the flats of the hexagons and the septa are some 1½ m.m. thick. The diameter of the lead cylinder 21 is not critical and is chosen to suit the desired field of view, the size of the scintillation screen and the magnification of the lens system that are used. The cylinder 21 is mounted in a cast aluminium plate 24 that is carried in a first framework 25, and can move in the framework 25 on linear bearings 26. Power to move the aluminium plate 25 is provided by double-acting cylinders 28a, which may be either hydraulic or pneumatic in nature. The framework 25 is carried in a second framework 27, that is mounted in the support 2 shown in FIG. 1, and is free to move in the framework 27 in a manner analogous to that of the aluminium plate 24 in the framework 25 but along an axis at right angles to that in which the first framework 25 moves. Power is supplied by double-acting cylinders 28b. The total amount of movement in each direction is arranged to be about four times the width of the cells 23. A suitable distributor system, which is not shown, supplies power to the operating cylinders 28a and 28b in a manner such as to cause them to move the plate 24, and hence the collimator proper, in an approximately random fashion in a plane defined by the axis of motion in the framework 25 and 27. A suitable number of oscillations per exposure of a film is greater than 5, with an optimum between 10 and 20 oscillations per exposure. If desired, rotary motion can also be included.

The approximately random motion of the collimator proper substantially eliminates the "patchy" effect due to the holes of the collimator, and renders the septa of the collimator invisible in the final picture. As a result, the resolution of the collimator becomes a factor only of the size of the holes of the collimator and its thickness, and does not involve the thickness of the septa, (providing it is great enough to prevent excessive penetration of radiation from one cell to another). Typically with holes some ½ cm. wide, the overall resolution is about 2 mm. to 3 mm. as opposed to the 10 mm. of conventional gamma cameras. That is, the resolution of the collimator is no longer a function of the distance from centre to centre of each cell 23, which allows cells 23 of large size to be used if required, thus improving the sensitivity of the gamma camera. Also, partly due to the elimination of the "patchy" effect, fine detail in the image is rendered more easily visible.

The use of the invention is particularly advantageous when high energy gamma rays are utilised which require coarse collimators with thick septa, and enables the overall resolution in such cases to be significantly improved without any loss in sensitivity.

Different forms of the motion of the collimator may be used, but care must be taken to ensure that the motion is such that the collimator stays no longer at any given site than another, i.e. that the motion is at least approximately random. If this is not done, a spurious pattern will result corresponding to the "preferred" position of the collimator holes. For example, if the collimator is simply rotated about its centre, at a given point a resolution will be produced that is dependent upon the distance of that point from the centre of rotation; there will result circular regions of increased brightness. An epicyclic motion with an amplitude of some five hole dimeters however will reduce these effects to an insignificant level, particularly if an array of square holes is used in the collimator.

Figure 3:
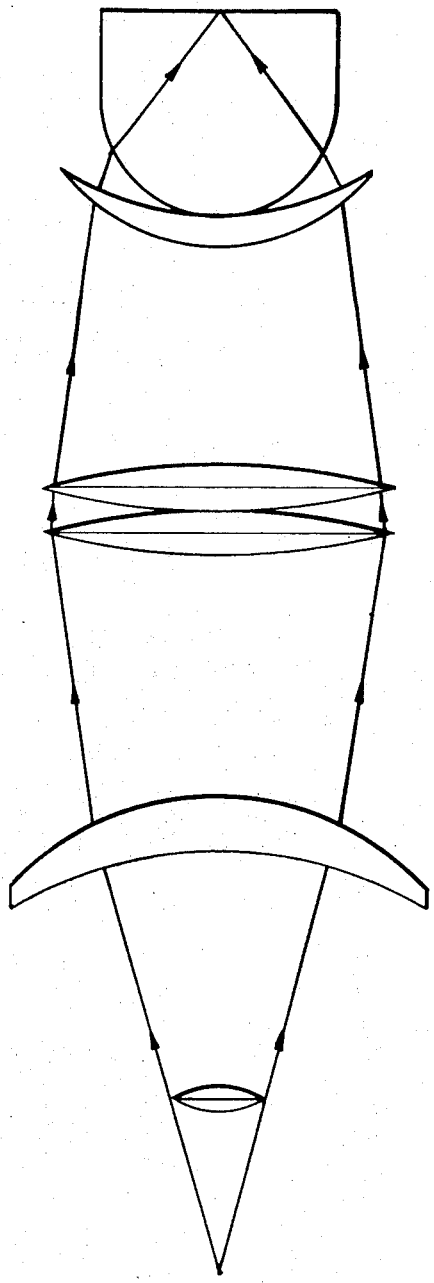
FIG. 3 shows an embodiment of this invention for viewing only selected scintillations.

In a modified gamma camera, which is shown diagrammatically in FIG. 3 the energising of the image intensifier only in response to desired scintillations in the scintillation screen 3 is achieved by embedding the scintillation screen in the smaller end of a light pipe 50 in the form of a truncated cone with the smaller end towards the collimator 1. The light pipe 50 is made of a transparent plastics material such as that known as Lucite.

Three photo-multipliers, 52, 54 and 56 although, of course more may be used if desired, are arranged equidistant around the periphery of the larger plane face of the light pipe, and the conical surface of the light pipe and the planar ends, except for areas corresponding to the scintillation screen; an exit for light transmitted through the pipe and the photo-multipliers are covered with a white diffuse reflecting material. The photo-multipliers are connected to a pulse height analyser 58 and a high tension switch 60 which is arranged to energise the image intensifier 5.

A large proportion of the light emitted by the scintillation screen and not collected by the lens system normally undergoes many internal reflections within the scintillation screen. The shape of the light guide and the diffusely reflecting surfaces ensure that some of this light falls upon the photo-cathodes of the photo-multipliers, so that the sum of the output signals from the photo-multipliers is related to the energy of the original photon-generating event which caused the scintillation in the scintillation screen, regardless of where in the scintillation screen the event originated. The total signal from the three photo-multipliers is amplified and is sampled by the pulse height analyser which is arranged to select only those pulses which, by a previous calibration, are known to correspond to a desired photon-generating event. These desired pulses are passed to the height tension switch resulting in the energising of the image intensifier.

We claim:

1. A gamma ray camera for forming a collimated gamma ray image having a given resolution power from an extended source of non-collimated gamma rays, said camera comprising:

a multi-channel apertured plate with parallel aperture axes for collimating gamma rays emanating from said source of gamma rays, a first frame in which said apertured plate is movably mounted, a second frame in which said first frame is movably mounted, random movement means connected between said apetured plate and said first and second frames for causing said apertured plate to continuously and effectively randomly move with respect to said extended source in a plane perpendicular to the aperture axes, dimensions of said aperatures being increased to improve camera sensitivity without introducing any overall loss in said given camera resloution power due to said continuous and effectively random relative motion.

2. A gamma ray camera as in claim 1 wherein:
said apertured plate comprises a lead cylinder at least approximately 5 cm thick with at least approximately 2 mm square apertures therein separated by septa at least approximately 0.75 mm thick.

3. A gamma ray camera as in claim 1 wherein:
said apertured plate comprises a lead cylinder at least approximately 5 cm thick with a hexagonal array of hexagonal shaped apertures at least approximately 6 mm wide across the flats of the hexagons therein separated by septa at least approximately 1.5 mm thick.

4. A gamma ray camera as in claim 1 wherein said random movement means comprises:
a first pair of double acting cylinders connected to produce relative movement between said apertured plate and said first frame, and a second pair of double acting cylinders connected to produce relative movement between said first and second frames.

5. A gamma ray camera as in claim 1 wherein said random movement means effects a plurality of aperture passes over virtually all areas of said extended source during each image exposure period.

6. A gamma camera as in claim 1 wherein said random movement means effects a plurality of aperture passes over virtually all areas of said extended source during each image exposure period.

7. A gamma camera as in claim 1 and further comprising:
a scintillation screen positioned to receive collimated radiation from said collimator, an image intensifier vacuum tube having a photo-cathode, and means for forming an image of the distribution of light emitted by said scintillation screen on the photo-cathode of the image intensifier.

8. A gamma camera according to claim 7 including means for operating the image intensifier only in response to selected scintillations of the screen.

9. A device according to Claim 8 wherein the means for operating the image intensifier only in response to selected scintillations comprises; a plurality of photomultipliers disposed about the periphery of a light guide arranged to cause the light emitted by the scintillation screen to be incident upon the photo-cathode of the tube; means for amplifying pulses from the photomultipliers, pulse height analysing means, and means for operating the image intensifier in response only to pulses of a predetermined magnitude selected by the said pulse height analyser.

* * * * *